(12) United States Patent
Jerance

(10) Patent No.: US 11,668,587 B2
(45) Date of Patent: Jun. 6, 2023

(54) METHOD FOR DETERMINING A RELATIVE ANGULAR POSITION BETWEEN TWO PARTS

(71) Applicant: ELECTRICFIL AUTOMOTIVE, Beynost (FR)

(72) Inventor: Nikola Jerance, Lyons (FR)

(73) Assignee: ELECTRICFIL AUTOMOTIVE, Beynost (FR)

( * ) Notice: Subject to any disclaimer, the term of this patent is extended or adjusted under 35 U.S.C. 154(b) by 0 days.

(21) Appl. No.: 16/972,715

(22) PCT Filed: Jun. 11, 2019

(86) PCT No.: PCT/FR2019/051408
§ 371 (c)(1),
(2) Date: Dec. 7, 2020

(87) PCT Pub. No.: WO2019/239057
PCT Pub. Date: Dec. 19, 2019

(65) Prior Publication Data
US 2021/0088359 A1 Mar. 25, 2021

(30) Foreign Application Priority Data
Jun. 15, 2018 (FR) ...................................... 1855274

(51) Int. Cl.
*G01D 5/14* (2006.01)
(52) U.S. Cl.
CPC ..................................... *G01D 5/145* (2013.01)
(58) Field of Classification Search
CPC ...................................................... G01D 5/145
See application file for complete search history.

(56) References Cited

U.S. PATENT DOCUMENTS

| 6,433,537 B1 | 8/2002 | Petersen |
| 6,448,763 B1 | 9/2002 | Spellman |

(Continued)

FOREIGN PATENT DOCUMENTS

| CN | 107449354 A | 12/2017 |
| DE | 20210548 U1 | 8/2003 |

(Continued)

OTHER PUBLICATIONS

MLX90372—TRIAXIS Position Processor Datasheet, Melexis, Revision 8, Mar. 8, 2019.

(Continued)

*Primary Examiner* — Walter L Lindsay, Jr.
*Assistant Examiner* — Milton Gonzalez
(74) *Attorney, Agent, or Firm* — Ladas & Parry LLP; Malcolm J. MacDonald, Esq.

(57) ABSTRACT

A method for determining an angular position between two parts having a magnetized body cylindrical of revolution and with a diametrical magnetization; and two measurement cells in positions spaced by a non-zero fixed angle strictly less than a 90 degree angle about the axis of rotation. The method includes arranging the two measurement cells on the second part such that their primary measurement axes are parallel to each other, and that their secondary measurement axes are parallel to each other; and determining a value representative of the relative angular position as a function of a ratio between the difference of the secondary components and the difference of the primary components, measured by the two cells.

8 Claims, 3 Drawing Sheets

(56) References Cited

U.S. PATENT DOCUMENTS

| | | | |
|---|---|---|---|
| 6,545,462 | B2 | 4/2003 | Schott et al. |
| 6,545,463 | B1 | 4/2003 | Dettmann et al. |
| 6,720,763 | B1 | 4/2004 | Nehl et al. |
| 6,762,897 | B1 | 7/2004 | Kabashima et al. |
| 7,005,847 | B2 | 2/2006 | Gassman et al. |
| 7,030,608 | B2 | 4/2006 | Kawashima et al. |
| 7,038,448 | B2 | 5/2006 | Schott et al. |
| 7,402,997 | B2 * | 7/2008 | Mouaici ............... G01D 5/145 324/207.21 |
| 7,495,432 | B2 | 2/2009 | Kato et al. |
| 7,741,839 | B2 | 6/2010 | Jarrard |
| 7,808,234 | B2 | 10/2010 | Kurihara |
| 8,072,209 | B2 | 12/2011 | Jerance et al. |
| 8,093,886 | B2 | 1/2012 | Okada et al. |
| 8,283,914 | B2 | 10/2012 | Mehnert et al. |
| 8,373,410 | B2 | 2/2013 | Frachon |
| 8,519,700 | B2 | 8/2013 | Jerance et al. |
| 8,587,294 | B2 | 11/2013 | Masson et al. |
| 8,656,597 | B2 | 2/2014 | Pellenc |
| 8,890,514 | B2 | 11/2014 | Masson et al. |
| 8,912,791 | B2 | 12/2014 | Liebart |
| 8,970,210 | B2 | 3/2015 | Masson et al. |
| 9,041,387 | B2 | 5/2015 | Holman, Jr. et al. |
| 9,052,218 | B2 | 6/2015 | Heriban et al. |
| 9,175,943 | B2 | 11/2015 | Sterling |
| 9,207,100 | B2 | 12/2015 | Frachon et al. |
| 9,316,482 | B2 | 4/2016 | Delbaere et al. |
| 9,410,788 | B2 | 8/2016 | Wallrafen |
| 9,506,738 | B2 | 11/2016 | Onodera et al. |
| 9,605,978 | B2 | 3/2017 | Ausserlechner et al. |
| 9,746,345 | B2 * | 8/2017 | Baumann ............. G01D 5/2448 |
| 9,945,691 | B2 | 4/2018 | Reymond |
| 10,072,944 | B2 | 9/2018 | Klocke et al. |
| 2005/0253578 | A1 | 11/2005 | Kawashima et al. |
| 2006/0012362 | A1 | 1/2006 | Gassman et al. |
| 2006/0028203 | A1 | 2/2006 | Kawashima et al. |
| 2007/0139042 | A1 | 6/2007 | Legrand |
| 2008/0100284 | A1 | 5/2008 | Dobler et al. |
| 2009/0033315 | A1 | 2/2009 | Kawashima et al. |
| 2009/0224750 | A1 | 9/2009 | Hosek et al. |
| 2009/0309580 | A1 | 12/2009 | Dmytriw et al. |
| 2011/0043197 | A1 | 2/2011 | Trontelj et al. |
| 2011/0115479 | A1 | 5/2011 | Blakesley |
| 2011/0304324 | A1 | 12/2011 | Acker |
| 2012/0152049 | A1 | 6/2012 | Benson et al. |
| 2013/0179117 | A1 | 7/2013 | Blakesley |
| 2015/0022192 | A1 * | 1/2015 | Ausserlechner ......... G01B 7/30 324/207.25 |
| 2015/0142376 | A1 | 5/2015 | Ausserlechner |
| 2015/0226581 | A1 | 8/2015 | Schott et al. |
| 2016/0061630 | A1 | 3/2016 | Ausserlechner et al. |
| 2017/0074680 | A1 | 3/2017 | Reymond |
| 2017/0254671 | A1 | 9/2017 | Aichriedler et al. |
| 2019/0271568 | A1 * | 9/2019 | Kozomora ........... G01R 33/091 |
| 2020/0393270 | A1 | 12/2020 | Delbaere et al. |
| 2021/0088359 | A1 | 3/2021 | Jerance |

FOREIGN PATENT DOCUMENTS

| | | |
|---|---|---|
| DE | 202007006955 U1 | 8/2007 |
| DE | 102006051720 A1 | 9/2007 |
| DE | 102012111653 A1 | 6/2014 |
| DE | 10 2017 221 753 A1 | 6/2019 |
| EP | 0511459 B1 | 11/1992 |
| EP | 0800055 A1 | 10/1997 |
| EP | 1074818 A2 | 2/2001 |
| EP | 1083406 A2 | 3/2001 |
| EP | 1882871 A1 | 1/2008 |
| FR | 3 079 927 A1 | 10/2019 |
| JP | 2009192261 A | 8/2009 |
| WO | 2014090343 A1 | 6/2014 |

OTHER PUBLICATIONS

M. Delbaere, D. Frachon & G. Masson, 2014-01-1694, SAE International, Magnetic Resolver.
AS5403A/D/E, 3D Hall Position Sensor, ams Datasheet, 2017.
T. Dorge et al., High precision and simple analog through-shaft magnetic sensors, SENSOR + TEST conferences 2011.
MLX90365 Triaxis Position Sensor IC, Datasheet, Meiexis.
MLX903333 Triaxis 3D Position Sensor, Datasheet, Meiexis, Janvier 2008.
MLX90333 Triaxis 3D joystick Position Sensor, as electronic 2008.

* cited by examiner

110 — Equipping the first part 14 with a magnetized body 10, in the shape of an angular cylindrical sector of revolution about the axis of rotation A, and with a diametrical magnetization.

120 — Equipping the second part 16 with a first measurement cell 11 at a first measurement point P1 and with a second measurement cell 12 at a second measurement point P2.

130 — Each measurement cell delivers at least two electrical signals representative of a primary component $B_{x1}$, $B_{x2}$ and a secondary component $B_{y1}$, $B_{y2}$ of the vector representative of the magnetic field created by the magnetized body 10 at the measurement point P1, P2 of the considered cell.

140 — Determining a raw angle whose tangent is a function of a ratio between the difference of the secondary components and the difference of the primary components, measured by the two cells 11, 12 for a given relative angular position.

150 — Determining a value representative of the relative angular position θ between the two parts.

FIG.5

METHOD FOR DETERMINING A RELATIVE ANGULAR POSITION BETWEEN TWO PARTS

The invention relates to a method for determining a relative angular position of a first part with respect to a second part about an axis of rotation, which will be advantageously implemented using a magnetic position sensor system.

The technical advantages of the magnetic sensor systems are well known. They can be produced at relatively low costs, they are not subject to significant mechanical wear, and they are nearly insensitive to moisture and non-magnetic dirt (dust, oil, etc.). Thanks to these advantages, magnetic sensor systems are often used in automotive applications.

A magnetic angular position sensor system includes at least one magnetized body with permanent magnetization, and at least one magnetic field measurement cell, the sensor system being provided to measure the relative position of the measurement cell with respect to the magnetized body, about the axis of rotation.

In a practical application, the mechanism to be monitored includes a first part and a second part which are movable in rotation with respect to each other. The magnetized body is made secured to the first part, or integrated therein, while the measurement cell(s) is/are made secured to the second part of the mechanism, and the sensor system allows determining the relative position of the two parts of the mechanism.

In some cases, it is desired to be able to measure the relative position over an angular stroke strictly less than 360 degree angle. However, in other cases, it is desired to be able to determine the relative position over 360 degree angle about the axis of rotation, even over 360°.

Typically, in an application in the automotive field, such sensor systems are used to determine the angular position of a steering wheel, which moves with respect to a fixed part of the vehicle over more than 360 degrees. In this case, a sensor system is generally disposed at the steering column. According to another application, such sensor systems can be used to determine the angular position of an output member of an actuator, for example for a parking brake actuator. The invention is intended to solve the problems related to the practical implementation of the sensor systems, which are often intended to be integrated in a constrained space, with a limited available volume, and often in the presence of ferromagnetic parts in the vicinity of the sensor system, which may reduce the accuracy of the determination of the angular position.

Document U.S. Pat. No. 8,587,294 discloses a method in which a sensor system is implemented by using a linear combination of the radial component with the tangential component of the magnetic field created by a magnetized body. In this method, a first part is equipped with a magnetized body, in the shape of a cylindrical ring of revolution about the axis of rotation, and with a diametrical magnetization. A second part is equipped with a first measurement cell at a first measurement point and with a second measurement cell at a second measurement point. Each measurement cell delivers at least two electrical signals representative respectively of a primary component and a secondary component of the orientation of the magnetic field created by the magnetized body at the measurement point of the considered cell, respectively along a primary measurement axis and a secondary measurement axis which are orthogonal together and orthogonal to the axis of rotation. The first measurement point of the first measurement cell and the second measurement point of the second measurement cell are at equal distance from the axis of rotation. In this document, the two measurement points are arranged in positions spaced by 90° about the axis of rotation. In this way, the two cells measure, at each of the two measurement points, respectively a purely radial component and a purely tangential component of the field created by the magnetized ring at the considered measurement point. This solution requires two measurement cells placed at 90° magnetic with respect to each other. This means that the magnetic field is measured at two points separated by a large distance, which increases the sensitivity of the sensor to the mounting tolerances and to the magnetic disturbances. In addition, this involves the use of a relatively bulky sensor system.

Document US-2015/0142376 presents various devices which all have in common to dispose measurement cells on the axis of rotation of the magnetized system, facing a transverse end face of the magnetized system. Due to this need to dispose the measurement cells on the axis of rotation, the corresponding sensor system of D1 must imperatively be arranged at the axial end of the shaft of the mechanism whose rotational position is to be measured. In FIG. 13, this document shows a device in which the magnet has a cylindrical magnet of revolution which is divided into two portions. The direction of magnetization of the material constituting the magnetized body is reverse between the two portions, that is to say the magnetization vector always has reverse directions between the two portions.

The invention aims at defining a method for determining the relative angular position between two parts which allows the use of a more compact sensor system.

For this purpose, the invention proposes a method for determining a relative angular position of a first part with respect to a second part about an axis of rotation, the method comprising:

equipping the first part with a magnetized body, in the shape of an angular cylindrical sector of revolution about the axis of rotation, and with a diametrical magnetization;

equipping the second part with a first measurement cell at a first measurement point and with a second measurement cell at a second measurement point, each measurement cell delivering at least two electrical signals respectively representative of a primary component and a secondary component of the magnetic field created by the magnetized body at the measurement point of the considered cell, respectively along a primary measurement axis (x) and a secondary measurement axis which are orthogonal together and orthogonal to the axis of rotation;

arranging the first measurement point of the first measurement cell and the second measurement point of the second measurement cell at equal distance from the axis of rotation and in positions spaced by a non-zero fixed angle strictly less than 90 degree angle about the axis of rotation;

characterized in that:

the first and second measurement cells are arranged on the second part such that the primary measurement axes of the first and second measurement cells are parallel to each other, and that the secondary measurement axes of the first and second measurement cells are parallel to each other;

the method determines a value representative of the relative angular position between the two parts by determining a raw angle whose tangent is a function of a ratio between on the one hand the difference of the secondary components and on the other hand the difference of the primary components, measured by the two cells for a given relative angular position.

According to other characteristics of the invention, taken individually or in combination:

The first and second measurement cells may be arranged on the second part such that the primary measurement axes of the first and second measurement cells, or the secondary measurement axes of the first and second measurement cells, are oriented along the direction of a bisector of the angular deviation between the two measurement points, measured about the axis of rotation in a plane perpendicular to the axis of rotation.

The method can calculate the relative angular position by subtracting, from the calculated raw angle, a fixed angular deviation.

The magnetized body may have the shape of a section of a cylindrical tubular sector of revolution about the axis of rotation.

The magnetized body may have the shape of a section of an angular sector of a cylindrical disc of revolution about the axis of rotation.

The magnetized body may have the shape of a 360° angular sector about the axis of rotation.

The first and second measurement cells can be arranged on the second part in positions spaced by a non-zero fixed angle less than 30 degree angle, preferably less than or equal to 20 degree angle about the axis of rotation.

Various other characteristics emerge from the description given below with reference to the appended drawings which show, by way of non-limiting examples, embodiments of the object of the invention.

Figure 1:
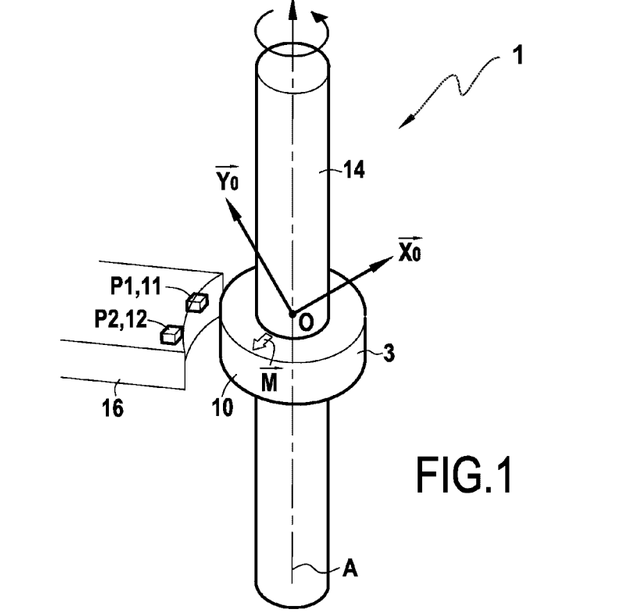
FIG. 1 is a schematic perspective view illustrating one embodiment of a sensor system for implementing the invention.
Figure 2:
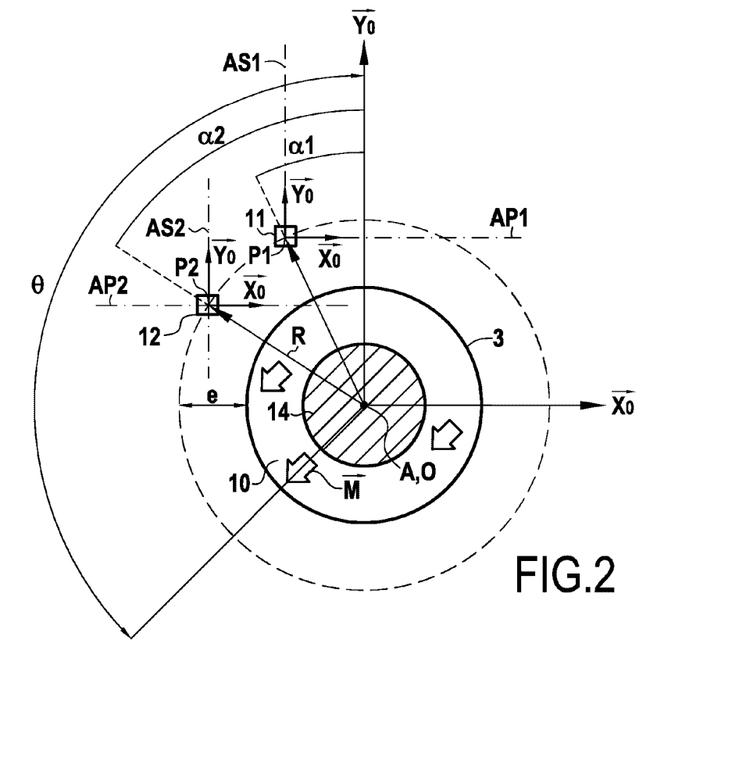
FIG. 2 is a schematic view, in cross-section through a plane perpendicular to the axis of rotation, of the system of FIG. 1.

FIGS. 1 and 2 illustrate one embodiment of a magnetic position sensor system 1 allowing the implementation of a method for determining the relative angular position according to the invention.

For this first embodiment, the sensor system 1 is designed to determine the relative position of two parts 14, 16 which are likely to move with respect to each other on the one hand along a rotational movement of axis A. In the example, there is no other relative axis of displacement. However, it would be possible to provide that the two parts 14, 16 are likely to move with respect to each other along a second axis of relative displacement, which could for example correspond to a translation parallel to the axis of rotation A. In the example, it is considered that the two parts 14, 16 have no relative movement along the radial directions with respect to the axis of rotation A. The sensor system 1 can thus for example be used to detect the position of a steering wheel fixed on a steering column, the sensor system being advantageously arranged at a rotating shaft of the steering column.

The sensor system 1 includes on the one hand a magnetized body 10 with permanent magnetization $\vec{M}$, and at least two magnetic field measurement cells 11, 12. In a practical application, the magnetized body 10 is intended to be fixed to a first part 14 of a mechanism, for example a rotating shaft of a steering column or an output shaft of an actuator, which is movable with respect to a second part 16 of the mechanism, for example a fixed part of the structure of the vehicle or of a support part of the sensor system 1.

The sensor system 1 includes on the one hand a magnetized body 10 with permanent magnetization $\vec{M}$, and at least two magnetic field measurement cells 11, 12. In a practical application, the magnetized body 10 is intended to be fixed to a first part 14 of a mechanism, for example a rotating shaft of a steering column or an output shaft of an actuator, which is movable with respect to a second part 16 of the mechanism, for example a fixed part of the structure of the vehicle or of a support part of the sensor system 1.

The sensor system 1 is provided to determine the relative angular position of the magnetized body 10 with respect to the measurement cells 11, 12, about the axis of rotation A. The relative movement between the magnetized body 10 and the measurement cells 11, 12, which is a simple rotation in the considered example, can therefore be described in an orthogonal reference frame $(0, \vec{Xo}, \vec{Yo})$ in a plane perpendicular to the axis of rotation A, the point of origin 0 being a point on the axis A, preferably the center of the magnetized body 10, and the directions of the base vectors $\vec{Xo}$ and $\vec{Yo}$ being arbitrary but orthogonal to each other. In this reference frame, it is for example possible to consider that the directions of the base vectors $\vec{Xo}$ and $\vec{Yo}$ are linked to the second part 16 which carries the measurement cells 11, 12. In this reference frame, the first part 14 is movable and the second part 16 is fixed, but this is arbitrary insofar as only one relative movement between the two parts 14, 16 is considered.

The magnetized body 10 has a geometry in the shape of an angular cylindrical sector of revolution about the axis of rotation A. The angular sector could have an extent of less than 360 degree angle about the axis of rotation A. It could in particular then present a "tile" geometry, that is to say having the shape of a section of a sector of a cylindrical tube of revolution about the axis A, delimited by two lateral edges parallel to the axis of rotation A. However, the angular sector has, in the illustrated embodiment, an extent equal to 360 degree angle about the axis of rotation A, so that, in the example, the magnetized body 10 has a "ring" geometry, with the shape of a section of a cylindrical tube of revolution about the axis of rotation A.

Figure 3:
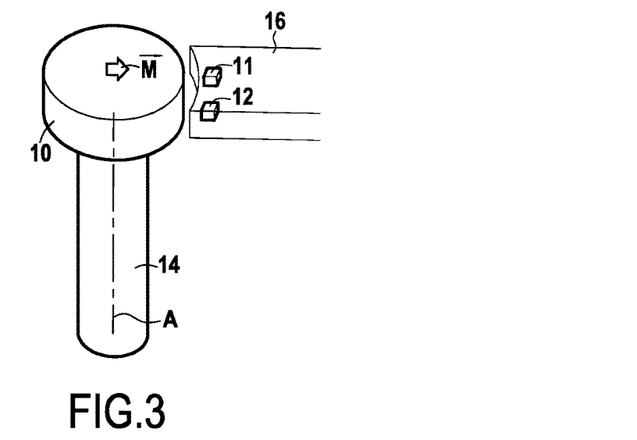
FIG. 3 is a view similar to that of FIG. 1, illustrating a second embodiment of a sensor system for implementing the invention.

In the example of FIG. 1, the magnetized body 10 is arranged on a shaft 14, at a distance from the longitudinal ends of the shaft, therefore with sections of the shaft 14 on each side of the magnetized body 10. However, as illustrated in FIG. 3, it is possible to provide a configuration in which the magnetized body is arranged at the shaft end, at a longitudinal end thereof. In this case, the magnetized body may, among other things if it must cover a 360° angular sector, have the geometry of a disc.

Of course, the magnetized body 10 has a thickness along a radial direction with respect to the axis of rotation A. In the case of a disk-type magnetized body, as illustrated in FIG. 3, the thickness corresponds to a radius of the disc.

The magnetized body 10 has a front envelope surface 3 which is, in the examples illustrated, the outer cylindrical surface of revolution about the axis of rotation A, of the magnetized body. Typically, in particular for an application for measuring the angular position of an output shaft of an actuator, the magnetized body may have an external diameter, corresponding to the diameter of the front envelope surface 3, which may be comprised in the range from 10 millimeters to 40 millimeters. For other applications, a larger diameter can be implemented.

During a relative displacement between the measurement cells 11, 12 on the one hand and the magnetized body 10 on the other hand, the measurement cells 11, 12 move relatively facing the front envelope surface 3 of the magnetized body 10. This implies that the measurement cells 11, 12 are offset with respect to the front envelope surface 3 of the magnetized body 10 along a radial direction with respect to the axis of rotation A. This also implies that the measurement cells 11, 12 are in correspondence with the front envelope surface 3 of the magnetized body 10 along the direction of the axis of rotation A. Preferably, the measurement cells 11, 12 are, as in the examples of FIG. 1 and FIG. 2, in correspondence with the mid-height of the front envelope surface 3 of the magnetized body 10 along the direction of the axis of rotation A. In the example, during the relative displacement between the magnetized body 10 and the measurement cells 11, 12, an air gap distance "e" is maintained constant between the measurement cells 11, 12 and the front envelope surface 3 of the magnetized body 10 along the radial direction with respect to the axis of rotation. However, it is not excluded that the air gap distance might be variable over at least part of the extent of the operational field.

The relative angular position determination made using the sensor system 1 is made for any relative angular position, between the measurement cells 11, 12 and the magnetized body 10, varying between two distinct extreme relative angular positions about the axis of rotation A, preferably for all relative angular positions at 360 degree angle. In some cases, it will be provided that the magnetized body 10 has a sufficient extent along the direction of the axis of rotation A so that the determination of the relative angular position is also for axial positions varying between two distinct extreme relative positions along the direction of the axis A.

At any magnetized point of the magnetized body 10, the magnetization direction $\vec{M}$ of the material constituting the magnetized body 10 is constant over the entire extension of the magnetized body, that is to say at any magnetized point of the magnetized body, the magnetization vector $\vec{M}$ always has the same absolute direction, in the way of always the same oriented direction, to the extent of usual industrial technical feasibility. In the examples, the magnetization direction $\vec{M}$ is of the generally diametrical type, and it is contained in a plane perpendicular to the axis of rotation A. Preferably, the constant magnetization direction $\vec{M}$ corresponds to the direction of a diameter derived perpendicularly from the axis of rotation A, which is an axis of revolution of the magnetized body, preferably the direction of a diameter contained in a diametrical plane of symmetry of the magnetized body 10.

In the examples, the magnetization of the magnetized body has a magnetization value M, or magnetization intensity, constant at any magnetized point of the magnetized body 10, at least to the extent of the usual industrial technical feasibility.

In the examples illustrated, the measurement points P1 and P2 of the first and second cells 11, 12 are arranged in the same plane perpendicular to the axis of rotation A. In the examples illustrated, this plane also has the particularly of being coincident with the magnetized body 10 along the axial direction of the axis of rotation A. Advantageously, it will be possible to ensure that this plane perpendicular to the axis of rotation A in which the measurement points P1 and P2 are located is a plane of symmetry of the magnetized body 10.

In the sensor system 1, each of the two measurement cells 11, 12 determines, at a corresponding measurement point P1, P2, values representative of the orientation of the magnetic field B created by the magnetized body 10 at these measurement points P1, P2. Each measurement cell 11, 12 delivers at least two electrical, for example digital and/or analog, signals representative respectively of a primary component and a secondary component of the vector representative of the magnetic field B induced by the magnetized body 10 at the measurement point of the considered cell, respectively along a primary measurement axis AP1, AP2 and along a secondary measurement axis AS1, AS2 which are orthogonal to each other and orthogonal to the axis of rotation A.

The first measurement point P1 of the first measurement cell 11 and the second measurement point P2 of the second measurement cell 12 are arranged at equal distance R from the axis of rotation A. Advantageously, they can be, as illustrated, arranged in positions spaced by a non-zero fixed angle strictly less than 90 degree angle about the axis of rotation A.

Furthermore, the first and second measurement cells 11, 12 are arranged on the second part 16 such that the primary measurement axes AP1 and AP2 of the first and second measurement cells 11, 12 are parallel to each other, and that the secondary measurement axes AS1 and AS2 of the first and second measurement cells 11, 12 are parallel to each other. In other words, the two measurement cells 11, 12, in particular their measurement elements, are arranged parallel to each other. This implies in particular that at least one of the two cells has primary AP1, AP2 and secondary AS1, AS2 measurement axes which, at the corresponding measurement point P1, P2 of this cell, are not aligned with the radial and tangential directions at this point with respect to the relative rotational movement of axis A. In the illustrated example, the primary measurement axes AP1, AP2 of the first and second measurement cells 11, 12 are oriented vectorially in the same way, and the secondary measurement axes AS1, AS2 of the first and second measurement cells are also oriented vectorially in the same way. In other words, the two measurement cells 11, 12, in particular their magnetosensitive elements, are arranged in the same way. However, the primary measurement axes AP1, AP2 of the first and second measurement cells 11, 12 and/or the secondary measurement axes AS1, AS2 of the first and second measurement cells 11, 12 can be vectorially oriented along the two opposite ways of the same direction. In this case, however, it will be necessary to express the algebraic values of the primary and secondary components with respect to the same way, on the same vector base, therefore take into account the opposite value of one of the two algebraic values delivered by the cell.

The measurement points P1 and P2 of the first and second cells 11, 12 are distinct points, spaced from each other about the axis of rotation A. The minimum distance between the two measurement points must be such that the representative values of the magnetic field created at these two points by the magnetized body differ by a deviation greater than the resolving power of the measurement cells. In other words, the first and second measurement cells must not deliver, as a result of their respective measurements at these two points, the same values representative of the vector representative of the magnetic field.

The first and second measurement cells 11, 12 can be arranged on the second part 16 such that the primary measurement axes of the first and second measurement cells or the secondary measurement axes of the first and second measurement cells are oriented along the direction of a bisector of the angular deviation between the two measurement points P1, P2, measured about the axis of rotation A in a plane perpendicular to the axis of rotation A. It can be provided that the first and second measurement cells 11, 12 are arranged on the second part 16 such that the primary measurement axes AP1, AP2 of the first and second measurement cells 11, 12 are oriented along the direction of the bisector of the angular deviation between the two measurement points, measured about the axis of rotation A in a plane perpendicular to the axis of rotation. As a variant, it can be provided that it is the secondary measurement axes of the first and second measurement cells that are oriented along the direction of the bisector of the angular deviation between the two measurement points. However, still other orientations are possible. FIG. 2 thus illustrates the case in which the primary measurement axes of the first and second measurement cells are oriented parallel to the arbitrary direction of the base vector $\vec{Xo}$. Consequently, the secondary measurement axes AS1, AS2 of the first and second measurement cells are oriented along the direction of the base vector $\vec{Yo}$.

There are many commercially available cells that allow obtaining these measurements.

An example of a cell that can be used in the invention can thus implement a component "MLX90365 Triaxis Position Sensor IC" which is marketed by the company Melexis NV, Rozendaalstraat 12, B-8900 Ieper, Belgium, and described in particular in the documentation "MLX90365 Triaxis Position Sensor IC Datasheet", revision number 5.8, dated 1 Nov. 2016. Other references from the same manufacturer can also be used, such as the references MLX90333 or MLX90364.

This type of measurement cell 11, 12 ensures a measurement of the magnetic field at a single point, by minimizing the number of integrated circuits and simplifying the production by decrease in the number of parts, knowing that each component introduces tolerances related to mounting uncertainties. The notion of measurement at a single point is assessed depending on the spatial resolution of the position measurement delivered by the sensor. Each measurement cell 11, 12 may for example comprise a magneto-sensitive unit generally composed of at least two magneto-sensitive elements, very close to each other to the point of being considered at the same point, and whose outputs are possibly used by a calculation unit of the measurement cell. Very often, the magneto-sensitive unit and the calculation unit are part of the same electronic component, which allows reducing the cost and increasing the reliability of the sensor. It can be envisaged to provide that the two measurement cells 11, 12 are integrated into the same electronic component, which may comprise a calculation unit common to the two cells. However, within the framework of the invention, it can be provided that the two cells are equipped with a communication unit for communicating information to a remote calculation unit, for example housed in an electronic control unit (ECU) or a computer.

With such a type of cell, it is possible to obtain, at each of the measurement points P1, P2, at least two components Bx, By of the vector representative of the magnetic field B created by the magnetized body 10 in an orthogonal reference frame. The two reference frames have different origins, respectively at the considered measurement point P1, P2, but identical base vectors. In the example of FIG. 2, and for the demonstration below, the reference frame is therefore respectively (P1, $\vec{Xo}$, $\vec{Yo}$), (P2, $\vec{Xo}$, $\vec{Yo}$), The first cell 11 allows in particular obtaining a first primary component Bx1, along the primary measurement axis AP1, of the vector representative of the magnetic field B at the point P1, and a first secondary component By1, along the secondary measurement axis AS1, of the vector representative of the magnetic field B induced by the magnetized body at point P1. The second cell 12 allows in particular obtaining a second primary component Bx2, along the primary measurement axis AP2, of the vector representative of the magnetic field B at point P2, and a second secondary component By2, along the secondary measurement axis AS2, of the vector representative of the magnetic field B induced by the magnetized body at point P2.

Within the framework of the invention, it is provided to determine a value representative of the relative angular position between the two parts 14, 16.

Figure 4:
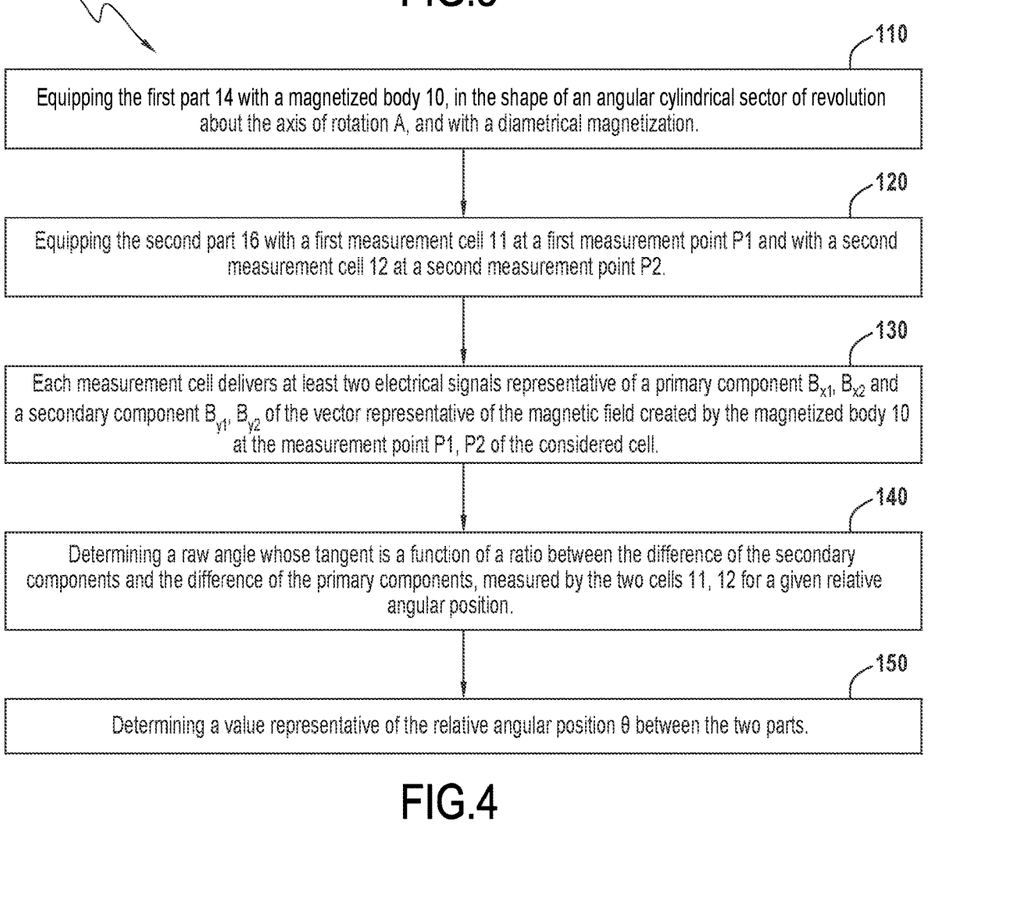
FIG. 4 illustrates the steps of a method according to the invention.

As illustrated in FIG. 4, it is thus understood that a method 100 according to the invention comprises a step 110 of equipping the first part 14 with a magnetized body 10, in the shape of an angular cylindrical sector of revolution about the axis of rotation A, and with a diametrical magnetization.

The method comprises a step 120 of equipping the second part 16 with a first measurement cell 11 at a first measurement point P1 and with a second measurement cell 12 at a second measurement point P2.

In these steps, it is ensured that the first measurement point P1 of the first measurement cell 11 and the second measurement point P2 of the second measurement cell 12 are arranged at equal distance from the axis of rotation A and in positions spaced by a non-zero fixed angle strictly less than 90 degree angle about the axis of rotation A, preferably less than 30 degree angle, more preferably less than or equal to 20 degree angle.

In step 130 of the method, each measurement cell delivers at least two electrical signals representative respectively of a primary component $B_{x1}$, $B_{x2}$ and a secondary component $By_1$, $By_2$ of the vector representative of the magnetic field created by the magnetized body 10 at the measurement point P1, P2 of the considered cell, respectively along a primary measurement axis AP1, AP2 and along a secondary measurement axis AS1, AS2 which are orthogonal to each other and orthogonal to the axis of rotation A.

In the method, the first and second measurement cells 11, 12 are arranged on the second part 16 such that the primary measurement axes AP1, AP2 of the first and second measurement cells are parallel to each other, preferably oriented vectorially in the same way, and that the secondary measurement axes AS1, AS2 of the first and second measurement cells are parallel to each other, preferably oriented vectorially in the same way.

The steps above of the method will be advantageously implemented by taking advantage of a sensor system 1 as described above.

In step 150, the method determines a value representative of the relative angular position θ between the two parts by determining in step 140 a raw angle whose tangent is a function of a ratio between on the one hand the difference of the secondary components and on the other hand the difference of the primary components, measured by the two cells 11, 12 for a given relative angular position.

This method thus includes one or several calculation step(s) which can be implemented in a calculation unit, the latter being integrated into the sensor system 1, or being remote, for example in an electronic control unit or a computer. The calculation unit typically includes one or several memory module(s), at least one processor, a data input/output module and possibly a communication module. The calculation steps of the method are typically implemented by a computer program containing the corresponding instructions and stored in the memory module.

Thus, it is provided to calculate a value $\Delta B_x$ representative of the difference between the first primary component $B_{x1}$ and the second primary component $B_{x2}$, measured respectively at points P1 and P2. Typically, this difference value can be written in the form of a function, for example a linear or affine function:

$$\Delta B_x = f_x(B_{x1} - B_{x2})$$

For example, it might be possible to have:

$$\Delta B_x = a_x^*(B_{x1} - B_{x2}) + c_x$$

In the simplest manner, it is possible to have:

$$\Delta B_x = B_{x1} - B_{x2} \qquad (1)$$

Likewise, it is provided to calculate a value $\Delta B_y$ representative of the difference between the first secondary component $B_{y1}$ and the second secondary component $B_{y2}$, measured respectively at points P1 and P2. Typically, this difference value can be written in the form of a function, for example a linear or affine function:

$$\Delta B_y = f_y(B_{y1} - B_{y2})$$

For example, it might be possible to have:

$$\Delta B_x = a_y^*(B_{y1} - B_{y2}) + c_y$$

In the simplest manner, it is possible to have:

$$\Delta B_y = B_{y1} - B_{y2} \qquad (2)$$

In this case, the invention provides for determining a raw angle gamma as being the arc whose tangent is representative of a ratio between on the one hand the difference of the secondary components and on the other hand the difference of the primary components, this ratio can be the ratio $\Delta B_y/\Delta B_x$ or the inverse ratio $\Delta B_x/\Delta B_y$. Depending on the chosen ratio, the raw angle gamma or its complementary angle (90°-gamma) will be obtained, from which it will be easy to return to the desired raw angle. Thus, this value of raw angle gamma can be written in the form of a function:

gamma=Arctan{$f[\Delta B_y/\Delta B_x]$} or gamma=Arctan{$f[\Delta B_x/\Delta B_y]$} namely, for example:

gamma=Arctan{$f[f_y(B_{y1}-B_{y2})/f_x(B_{x1}-B_{x2})]$}

In this equation, the function f can be considered as a filtering function of the measured values. In the simplest manner, it is possible to have:

gamma=Arctan{$Kx_y \times [(B_{y1}-B_{y2})/(B_{x1}-B_{x2})]$}  (3)

where $K_{xy}$ is a value equal to 1 for the theoretical calculation of the value of the angle of the magnetic field in the plane $(\vec{Xo}, \vec{Yo})$, but it is sometimes advantageous to use another value in order to compensate for measurement bias.

Indeed, θ refers to the angle representative of the relative angular position between the two parts 14, 16, measured in a plane perpendicular to the axis of rotation A, about the axis of rotation A. In the example, the angle θ representative of the relative angular position between the two parts 14, 16, is measured in the fixed reference frame $(0, \vec{Xo}, \vec{Yo})$ defined in the measurement plane $(\vec{Xo}, \vec{Yo})$, between the magnetization direction $\vec{M}$ of the magnetized body and the direction of the base vector $\vec{Yo}$, the latter having, by convention, in this example, a fixed direction with respect to the measurement cells 11, 12, therefore with respect to the second part 16.

In the fixed reference frame $(0, \vec{Xo}, \vec{Yo})$ defined in the measurement plane, the two measurement cells 11, 12 are located at the angular positions $\alpha_1$ and $\alpha_2$.

A three-dimensional view of an exemplary embodiment of the sensor system is illustrated in FIG. 1.

For a magnetized body 10 of the "ring" type, as illustrated in FIG. 2, the radial and tangential components of the magnetic field created by the magnetic body are given by the following relations.

The radial component Br1 of the magnetic field created by the magnetized body 10 at the first measurement point P1 of the first cell 11, in projection on a radius derived from the axis of rotation A and passing through the first measurement point P1, is given by:

$$B_{r1} = B_R \cos(\theta - \alpha_1) \qquad (6)$$

where $B_R$ is the maximum amplitude of the radial component of the magnetic induction at the distance R separating the measurement points P1 from the axis of rotation A.

The tangential component Bt1 of the magnetic field created by the magnetized body 10 at the first measurement point P1 of the first cell 11, in projection on a tangent to the rotation passing through the first measurement point P1 of the first cell 11, is given by:

$$B_{t1} = -B_T \sin(\theta - \alpha_1) \qquad (7)$$

where $B_T$ is the maximum amplitude of the tangential component of the magnetic induction at the distance R separating the measurement point P1 from the axis of rotation A.

$B_R$ and $B_T$ are intrinsic characteristics of the magnetized body 10, which depend in particular on its dimensions, on the used material and on its magnetization. If the radial field and the tangential field while the magnetized body 10 is rotating is measured at a fixed point located at the same distance R from the axis of rotation A, sinusoidal curves with maximum amplitudes, here called $B_R$ and $B_T$, are obtained as a function of the relative angular position of the magnetized body.

Similarly, the radial component Br2 of the magnetic field created by the magnetized body 10 at the second measurement point P2 of the second measurement cell 12, in projection on a radius derived from the axis of rotation A and passing through the second measurement point P2, is given by:

$$B_{r2} = B_R \cos(\theta - \alpha_2) \qquad (8)$$

The tangential component Bt2 of the magnetic field created by the magnetized body 10 at the second measurement point P2 of the second measurement cell 12, in projection on a tangent to the rotation passing through the second measurement point P2 of the second measurement cell 12, is given by:

$$B_{t2} = -B_T \sin(\theta - \alpha_2) \tag{9}$$

It is then possible to write the components Bx1, By1, in projection on the reference frame (P1, $\vec{X_o}$, $\vec{Y_o}$) linked to the first cell 11, of the vector representative of the magnetic field created at the first measurement point P1:

$$B_{x1} = -B_{r1} \sin(\alpha_1) - B_{t1} \cos(\alpha_1) \tag{10}$$

$$B_{y1} = B_{r1} \cos(\alpha_1) - B_{t1} \sin(\alpha_1) \tag{11}$$

In the same way, it is possible to write the components Bx2, By2, in projection on the reference frame (P2, $\vec{X_o}$, $\vec{Y_o}$) linked to the second cell 12, of the vector representative of the magnetic field B created at the first measurement point P2:

$$B_{x2} = -B_{r2} \sin(\alpha_2) - B_{t2} \cos(\alpha_2) \tag{12}$$

$$B_{y2} = B_{r2} \cos(\alpha_2) - B_{t2} \sin(\alpha_2) \tag{13}$$

By combining the equations (6) and (7) with the equations (10) and (11), as well as by combining the equations (8) and (9) with the equations (12) and (13), and by expressing the differences given by (1) and (2), there is:

For $\Delta B_x$:

$$\Delta B_x = (B_R + B_T)(\cos(\alpha_2)\sin(\alpha_2) - \cos(\alpha_1)\sin(\alpha_1))\cos(\theta) + (B_R + B_T)(\cos^2(\alpha_1) - \cos^2(\alpha_2))\sin(\theta) \tag{14}$$

For $\Delta B_y$:

$$\Delta B_y = (B_R + B_T)(\cos^2(\alpha_1) - \cos^2(\alpha_2))\cos(\theta) + (B_R + B_T)(\cos(\alpha_1)\sin(\alpha_1) - \cos(\alpha_2)\sin(\alpha_2))\sin(\theta) \tag{15}$$

(14) et (15) can be written in the following form:

$$\Delta B_x = A \cos(\theta) + B \sin(\theta) \tag{16}$$

$$\Delta B_y = B \cos(\theta) - A \sin(\theta) \tag{17}$$

with $$A = (B_R + B_T)(\cos(\alpha_2)\sin(\alpha_2) - \cos(\alpha_1)\sin(\alpha_1)) \tag{18}$$

$$B = (B_R + B_T)(\cos^2(\alpha_1) - \cos^2(\alpha_2)) \tag{19}$$

If now the angle $\delta$ is defined such that:

$$\cos(\delta) = \frac{A}{\sqrt{A^2 + B^2}} \tag{20}$$

$$\sin(\delta) = \frac{B}{\sqrt{A^2 + B^2}} \tag{21}$$

there is:

$$\Delta B_x = \sqrt{A^2 + B^2} \cos(\delta - \theta) \tag{22}$$

$$\Delta B_y = \sqrt{A^2 + B^2} \sin(\delta - \theta) \tag{23}$$

Finally, the angle calculated by (3) is found:

$$\text{gamma} = \delta - \theta \tag{24}$$

With $$\delta = \operatorname{atan}\left(\frac{B}{A}\right).$$

Therefore, the relative angular position $\theta$ is found, by the measurement (3), with the sign reversed and to the nearest constant, which is easily taken into account by the calibration of the sensor.

Figure 5:
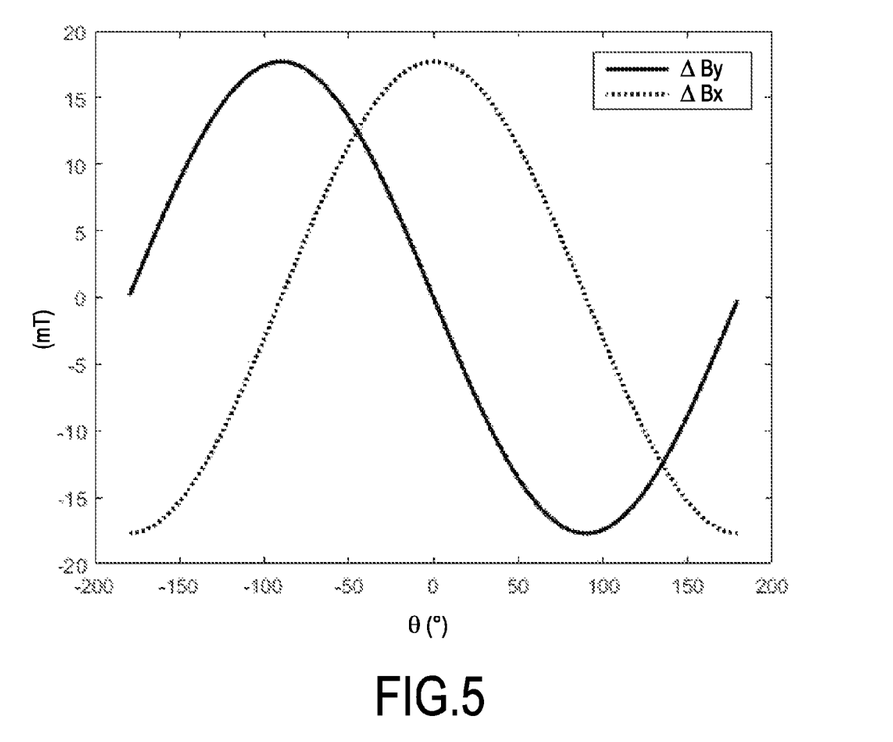
FIG. 5 illustrates differential signals obtained by simulation.

FIG. 5 thus illustrates graphs of the variations, obtained by numerical simulation, of the two values $\Delta B_x = B_{x2} - B_{x1}$ and $\Delta B_y = B_{y2} - B_{y1}$ for a variation in the relative angular position $\theta$ of 360 degree angle.

For this numerical simulation, the following parameters were retained for a geometry of a magnetized body of the "ring" type, as illustrated in FIG. 2:

External diameter of the magnet: 18 mm
Radial thickness of the magnet: 3 mm
Remanent induction of the magnet: 0.7 T
Air gap "e": 4 mm
Height of the magnet along axis ZO: 6 mm
Distance between the measurement points P1 and P2: 2.4 mm It is noted that, in the proposed method, the two values $\Delta B_x$ and $\Delta B_y$ which are taken into account have the same amplitude, which increases the accuracy of the sensor.

Furthermore, the value of the relative angular position $\theta$ which is determined by the method does not depend on the amplitudes $B_R$ and $B_T$, which makes the sensor system 1 robust with respect to the geometric tolerances.

In addition, it can be observed that the method leaves the possibility to choose the angular deviation between the two measurement points, which allows optimizing the sensor. For example, by disposing the measurement cells such that the two measurement points are sufficiently close in distance, it is possible to reduce the cost of the sensor by using a single electronic component which includes the two measurement cells, and possibly the calculation unit. In addition, the closer the two measurement cells, the more the differential calculation implemented in the proposed method will allow limiting the influence of a possible magnetic disturbance on the accuracy of the determination of the relative angular position of the two parts 14, 16. Such a magnetic disturbance may result in particular from the presence of ferromagnetic parts in the vicinity of the sensor system 1.

The invention is not limited to the examples described and represented because various modifications can be made without departing from its framework.

The invention claimed is:

1. A method for determining a relative angular position of a first part with respect to a second part about an axis of rotation, the method comprising:

equipping the first part with a magnetized body, in the shape of an angular cylindrical sector of revolution about the axis of rotation, having a front envelope surface which is an outer cylindrical surface of revolution, and with diametrical magnetization;

equipping the second part with a first measurement cell at a first measurement point and with a second measurement cell at a second measurement point, each measurement cell delivering at least two electrical signals representative of a primary component and a secondary component of the magnetic field created by the magnetized body at the measurement point of the measurement cell, along a primary measurement axis and a secondary measurement axis which are orthogonal together and orthogonal to the axis of rotation;

arranging the first measurement point of the first measurement cell and the second measurement point of the second measurement cell at equal distance from the axis of rotation and in positions spaced by a non-zero fixed angle strictly less than a 90 degree angle about the axis of rotation;

wherein the first and second measurement cells are arranged on the second part such that the primary measurement axes of the first and second measurement cells are parallel to each other, and that the secondary measurement axes of the first and second measurement cells are parallel to each other;

measurement points of the first and second measurement cells are arranged in a same plane perpendicular to the axis of rotation, said same plane being coincident with the magnetized body along an axial direction of the axis of rotation;

during a relative displacement between the measurement cells and the magnetized body the measurement cells move relatively, facing the front envelope surface of the magnetized body;

the method determines a value representative of the relative angular position between the two parts by determining a raw angle whose tangent is a function of a ratio between the difference of the secondary components, and the difference of the primary components, measured by the two cells for a given relative angular position.

2. The method according to claim 1, wherein the first and second measurement cells are arranged on the second part, such that the primary measurement axes of the first and second measurement cells or the secondary measurement axes of the first and second measurement cells are oriented along the direction of a bisector of the angular deviation between the two measurement points, measured about the axis of rotation in a plane perpendicular to the axis of rotation.

3. The method according to claim 1, wherein the method calculates the relative angular position by subtracting, from the calculated raw angle, a fixed angular deviation.

4. The method according to claim 1, wherein the magnetized body has the shape of less than a 360° angular sector about the axis of rotation.

5. The method according to claim 1, wherein the magnetized body has the shape of a 360° angular sector about the axis of rotation.

6. The method according to claim 1, wherein the first and second measurement cells are arranged on the second part in positions spaced by a non-zero fixed angle less than a 30 degree angle, less than or equal to a 20 degree angle about the axis of rotation.

7. The method according to claim 1, wherein, at any magnetized point of the magnetized body, the magnetization vector always has the same absolute direction.

8. The method according to claim 1, wherein the magnetized body is arranged on a shaft as the first part, at a distance from the longitudinal ends of the shaft, so that there are sections of the shaft on each side of the magnetized body.

* * * * *